Aug. 18, 1970 J. M. KEOHANE ET AL 3,525,076

COUNTER CONTROLLED SYSTEM FOR PROVIDING DUAL MODES OF ACCESS TO A MATRIX CROSSPOINT

Filed Aug. 22, 1966 4 Sheets-Sheet 1

INVENTORS
J. M. KEOHANE
J. F. SPOFFORD

BY [signature]

ATTORNEY

Aug. 18, 1970 J. M. KEOHANE ET AL 3,525,076

COUNTER CONTROLLED SYSTEM FOR PROVIDING DUAL MODES OF ACCESS TO A MATRIX CROSSPOINT

Filed Aug. 22, 1966 4 Sheets-Sheet 3

Aug. 18, 1970 J. M. KEOHANE ET AL 3,525,076

COUNTER CONTROLLED SYSTEM FOR PROVIDING DUAL MODES OF ACCESS TO A MATRIX CROSSPOINT

Filed Aug. 22, 1966 4 Sheets-Sheet 4

United States Patent Office 3,525,076

Patented Aug. 18, 1970

3,525,076

COUNTER CONTROLLED SYSTEM FOR PROVIDING DUAL MODES OF ACCESS TO A MATRIX CROSSPOINT

James M. Keohane, Lowell, Mass., and Jordan F. Spofford, East Kingston, N.H., assignors to Western Electric Company, Incorporated, New York, N.Y., a corporation of New York Filed Aug. 22, 1966, Ser. No. 574,075
Int. Cl. H04q 3/00
U.S. Cl. 340—166 5 Claims

ABSTRACT OF THE DISCLOSURE

A decade counter-controlled system utilizes common circuitry to provide dual modes of addressing a crosspoint in a coordinate matrix. In the first or preset access mode, plural presettable switches are utilized for obtaining immediate energizing access to preselected counting stages representative of individual matrix coordinates. In the second or random access mode, control circuitry is utilized for routing randomly selected numbers on a highest-order-digits first basis to corresponding individual counting stages. Each counter is driven by a bistable device and facilities are provided for synchronizing each device with its counter by changing the state of the bistable device associated with a particular counter when an odd numbered digit is stored in that counter, to condition the counter for the subsequent selection of the next highest digit therein.

This invention relates generally to a system for controlling the operation of a plurality of decade counters, and more particularly to a system that provides two modes of access to a matrix crosspoint.

Matrices are currently used in computing systems as a means for storing and retrieving data. They may also be employed to advantage in other arts, and more specifically, in the art of testing multiterminal wired products such as cables, bays of electrical equipment and the like. To implement the testing of multiterminal wired products, the matrix may, for example, be driven by counters in a sequential manner to connect individual wired product terminals to the input terminals of an appropriately designed test set or to more than one test set. With the test equipment inputs connected to a particular selected terminal or terminals, one or more tests may be performed by the test equipment on the circuitry which is connected to the selected product terminal or terminals.

The testing of multi-bank terminal equipment is normally performed on a sequential terminal-by-terminal basis or on a terminal-pairs-by-terminal-pairs basis to detect the presence of, for example, open or short circuits in the circuitry that is connected to these terminals. This sequential mode of operation is highly inefficient in those instances where it is desired to test only certain terminals in a group of terminals or where it is desired to jump from one bank of terminals to another bank of terminals, skipping intervening terminal banks in the process. Such a situation may arise where the test set is designed to test parameters which are only common to certain terminals or to all terminals in only certain terminal banks. It may also arise in those instances where certain terminals or terminal banks have been previously tested and to test them again would constitute a redundant exercise.

Of particular interest, is the case where the matrix is designed to test one type of electrical product so that, for example, one group of matrix crosspoints selects a sequence of terminals for a short circuit test, a second group of matrix crosspoints selects another sequence of terminals for an open circuit test, a third group of crosspoints selects still another group of terminals for a short circuit test and a fourth group of crosspoints selects still another group of terminals for an open circuit test. If another type of wired product is to be tested using this same matrix to select the tests which are to be performed upon particular terminals of that product, it may be that the capacity of any group of matrix crosspoints for selecting the desired test is exceeded by the number of terminals of the wired product. It then becomes necessary to select, for example, the third or the fourth group of matrix crosspoints immediately after the capacity of the first or the second group is exhausted so that an irrevelant group of crosspoints may be jumped or circumvented. Thus, if a capability existed for jumping from one group of terminals to another while circumventing irrevelent groups of terminals in the process, it would be possible to use a single, high-capacity matrix to connect the terminals of more than one type of multiterminal wired product to one or more pieces of test equipment.

It is an object of this invention to provide a system whereby individual or groups of matrix crosspoints may be readily selected.

Another object of this invention is a system which provides a preset and random modes of access to a matrix crosspoint.

A further object of this invention is to provide a system which selects or addresses two matrix coordinates upon the actuation of a single switch.

Still further, it is an object of this invention to provide a system whereby access to any selected matrix crosspoint may be made at random upon the actuation of a switch, which switch may be utilized subsequently to select one or more matrix coordinates.

Yet another object is to select a particular matrix coordinate through energization of a counting element in a decade counter driven by a multivibrator that is conditioned if an even-numbered counting element is selected to energize the next higher order odd-numbered counting element.

With these and other objects in view, the present invention contemplates a system which provides two modes of access to a matrix crosspoint, both modes of access being implemented by common circuitry. One mode, hereafter referred to as the preset access mode, permits a preselection of two matrix coordinates which define a matrix crosspoint to which future access is desired. The actuation of a single switch operates automatically to select or address two matrix coordinates and hence one matrix crosspoint. In accordance with a preferred embodiment of the invention, a plurality of these preset switches are employed so that the matrix may be advanced from one crosspoint to another with intervening crosspoints being bridged in the process. Once a crosspoint is selected, the system operates to address other matrix crosspoints in succession.

The second mode of operation, the random access mode, permits a random selection of any matrix crosspoint. This mode of access may be initiated by an operator depressing a switch which conditions the system for random access, the subsequent selection of the coordinates corresponding to the desired matrix crosspoint being on a highest-order-digit-first-basis. Once the desired crosspoint has been selected, the system proceeds to select all succeeding matrix crosspoints. The matrix coordinate is initially selected by energizing a corresponding counting element in a decade counter which is driven by a multivibrator.

The present system further contemplates the utilization of control circuitry which responds to the selection of an even-numbered counting element of the decade counter to synchronize or orient the multivibrator to avoid energizing the next higher and odd-numbered counting element of that counter than that desired.

A complete understanding of this invention may be had by reference to the following detailed description when read in conjunction with the accompanying drawings illustrating a preferred embodiment thereof, wherein.

BRIEF DESCRIPTION OF THE INVENTION

Figure 1:
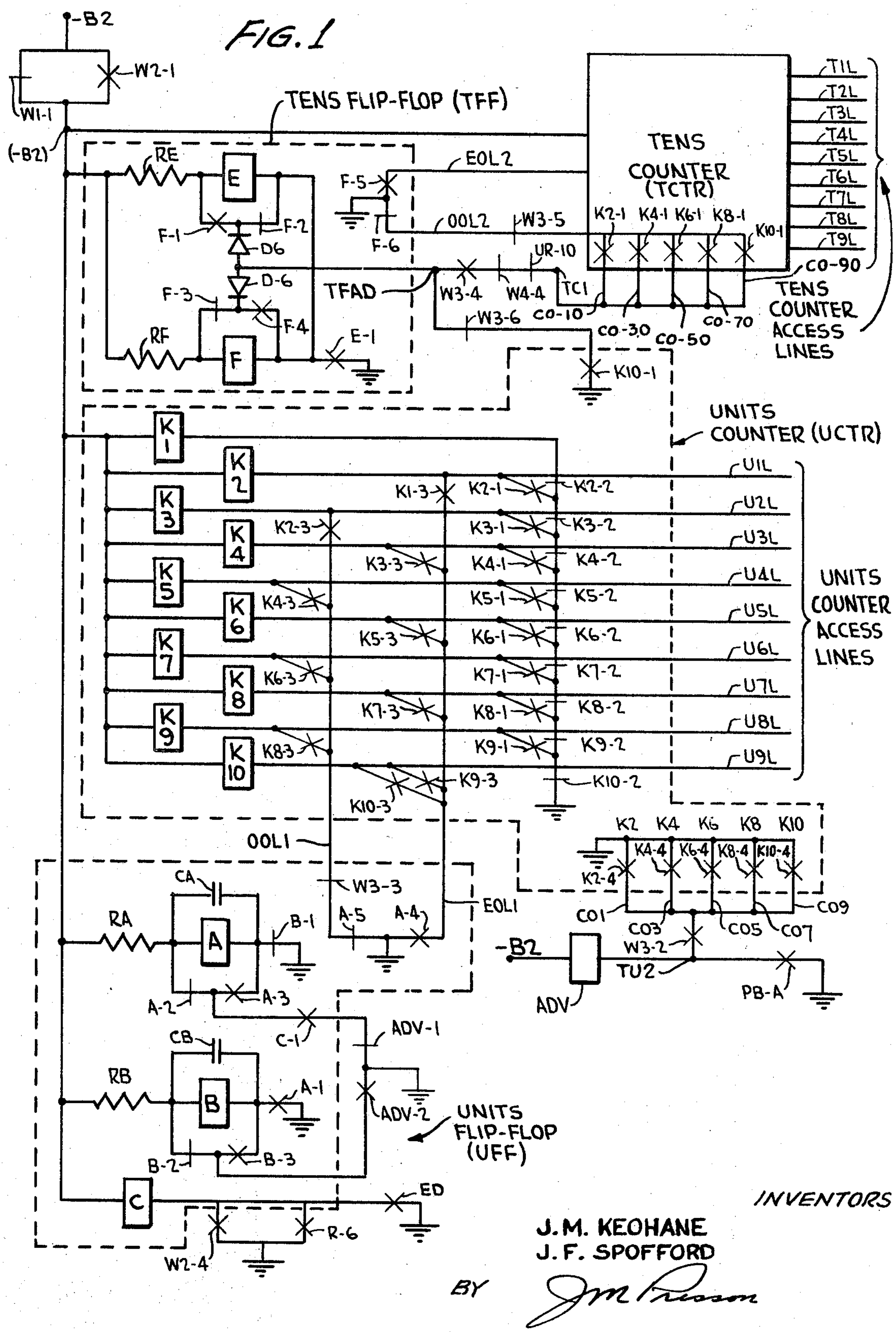
FIG. 1 is a schematic of two decade counters for selecting or addressing a matrix crosspoint, a multivibrator for driving each decade counter and circuits for synchronization of counter-driving multivibrators with their corresponding accessed counters.
Figure 4:
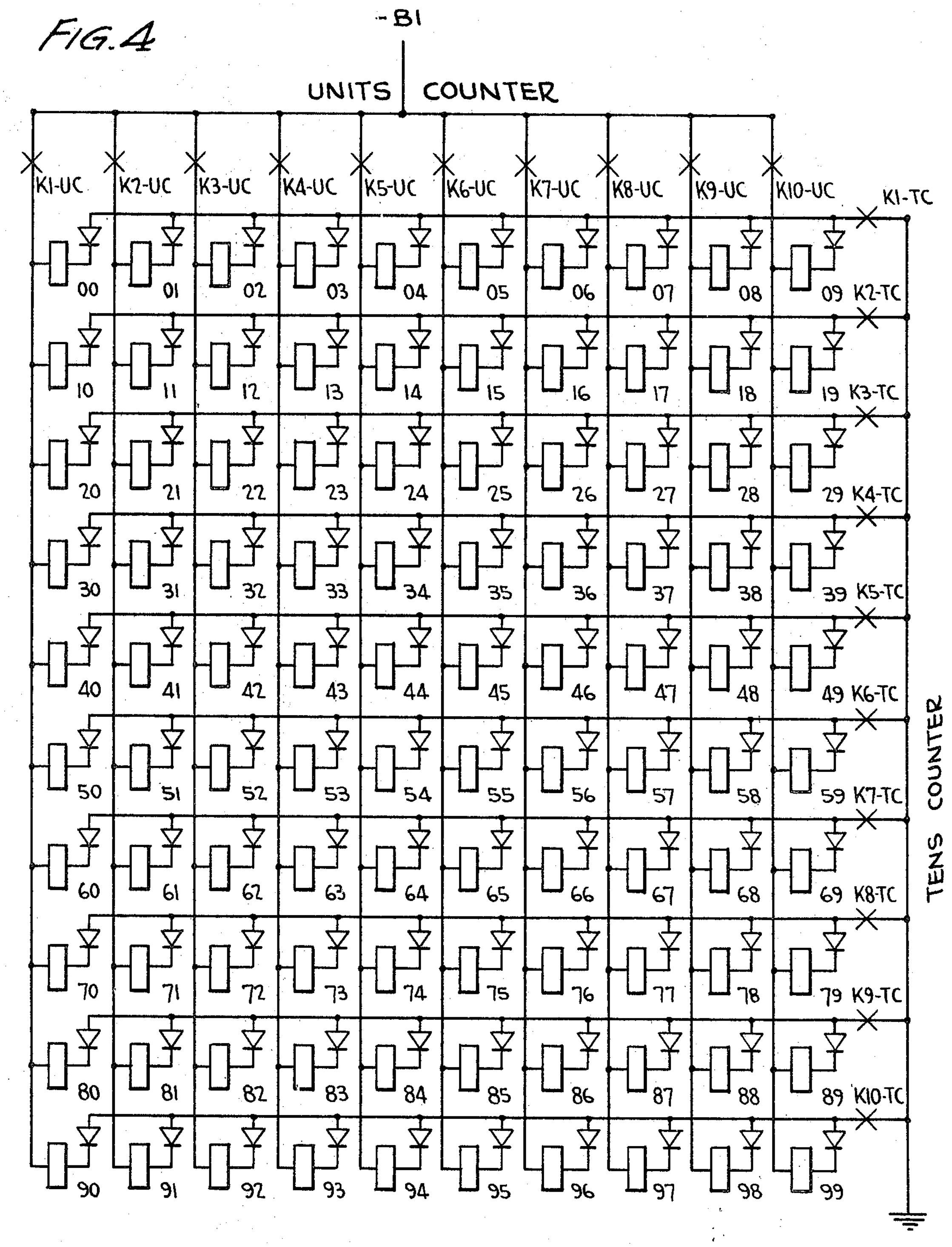
FIG. 4 is a schematic of a relay matrix which is driven by the counters of FIG. 1.

A units decade counter UCTR, FIG. 1, and a tens decade counter TCTR may be operated in normal counting sequence to close corresponding column and row contacts of a relay matrix, FIG. 4, and energize individual relays which are at the crosspoints of the closed coordinate column and row contacts.

The column or units counter contacts K1–UC, K2–UC . . . K10–UC are under the control of respective units counter relays K1, K2 . . . K10, FIG. 1, of the units counter UCTR, and the row or tens counter contacts K1–TC, K2–TC . . . K10–TC are similarly under the control of individual relays comprising the tens counter TCTR. The selection-by-energization of any one of the 100 relays in the matrix may be accomplished by closure of a row and a column pair of contacts. The energization of the matrix relays may, for example, be utilized to connect a terminal or pair of terminals, not shown, of a multiterminaled cable or multiterminaled electrical bay to appropriately designed test equipment, not shown. Alternatively, the energization of these matrix relays may be utilized to control the operation of other types of equipment which derive their control through various types of matrix elements.

The selection of any one of the 100 relays in the matrix is made by grounding one of the corresponding access leads T1L–T9L and U1L–U9L of the tens and units decade counters TCTR and UCTR, respectively, FIG. 1. It should be noted that if a demical "0" is desired, no access lead is provided because the counters normally set themselves to zero. The grounding of any units or tens access lead U1L, T1L; U2L, T2L . . . U9L, T9L is accomplished through closure of contacts PB–1, PB–2 . . . PB–9, FIG. 3.

Figure 2:
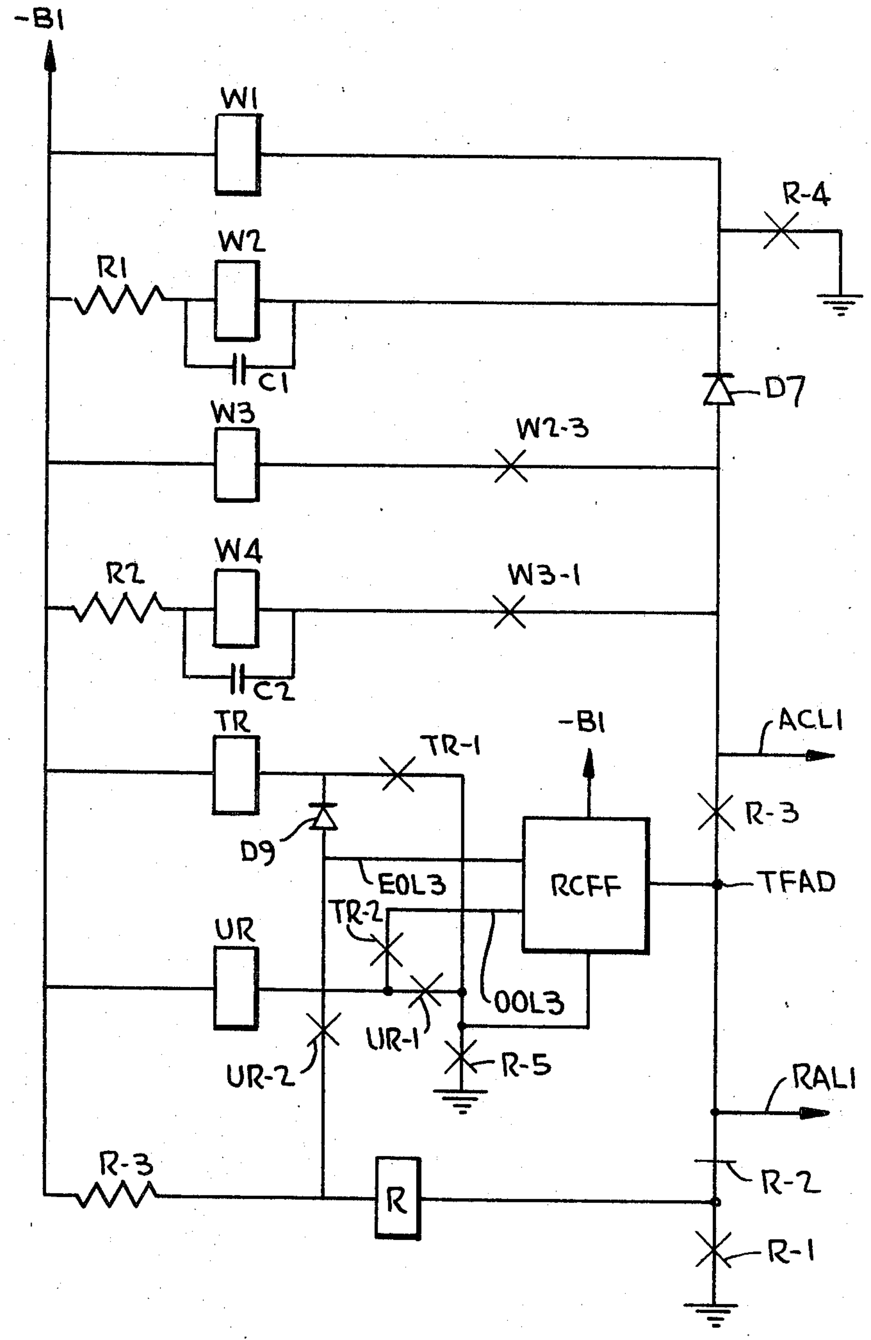
FIG. 2 is a schematic of a control circuit which provides timing circuits for the synchronization circuits in FIG. 1 and circuits which implement the random access mode of system operation.

Referring to FIG. 2, a circuit is illustrated which performs at least the following significant functions: (1) to condition the system for the selected mode of operation, (2) to provide timing circuits which synchronize the units and tens flip flops UFF and TFF, FIG. 1, so that the states of these flip flops agree with the registered count in the accessed counters UCTR and TCTR, respectively, and (3) to condition the system for the random access mode of operation so that common circuitry may be utilized to effect both modes of access.

Figure 3:
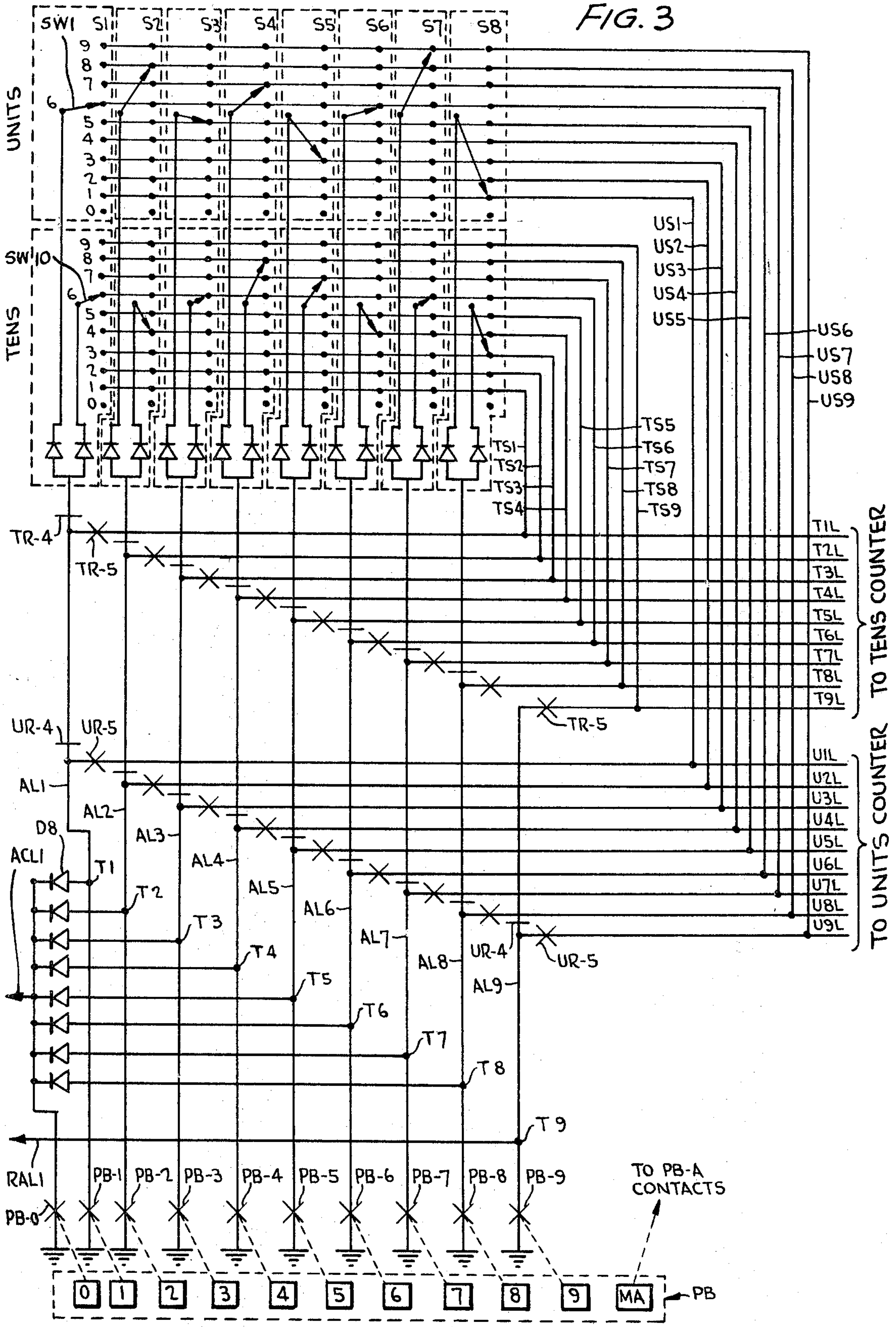
FIG. 3 depicts circuitry for selecting any desired matrix crosspoint during either a preset or a random access mode of operation.

With regard to function (1), in order to condition the system for either the preset or the random mode of operation, one of the ten pairs of contacts PB–O, PB–1 . . . PB–9, FIG. 3 is closed to put ground on either the access control line ACL1 or on the random access line RAL1, the latter line being grounded only when the number "9" pushbutton switch PB is manually depressed to close the contacts PB–9. When ground is applied to either line ACL1 or RAL1, FIG. 2, it traces through to the relays W1 and W2 causing successive operation of these relays. The relay W1 operates to remove battery —B2 from the units and tens flip flop UFF and TFF, FIG. 1, and the units and tens counters UCTR and TCTR, respectively. The relay W2 operates after relay W1 to restore battery —B2 to these flip flops and counters, thereby conditioning the system for operation in response to the closure of selected contacts PB–0, PB–1 . . . PB–9, FIG. 3.

With respect to function (2), it is necesary to synchronize the flip flops UFF and TFF, FIG. 1, so that the states of these flip flops agree with the two-digit number that is registered by the accessed counters UCTR and TCTR, respectively. When an even-numbered counter relay in either the units or tens counter UCTR or TCTR is energized, the circuit of FIG. 2 operates to change the state of the corresponding driving flip flop UFF or TFF so that after the selected counter relay energizes, the driving flip flop for that counter will operate to energize other counting relays in sequence. As an examination of FIG. 1 will bear out, the even-numbered counter relays, K2, K4 . . . K10, are connected to odd-numbered access line U1L, U3L . . . U9L, respectively. Thus, the synchronization of the flip flops UFF and TFF is only performed when energizing access to a counter relay is made through one of the odd-numbered access lines U1L, U3L . . . U9L or T1L, T3L . . . T9L.

Function (3) of the circuit of FIG. 2 involves conditioning the system for a random access mode of operation so that common circuitry may be used for both modes of access. In furtherance of this purpose, a bistable multivibrator RCFF, FIG. 2, operates upon closure of contacts PB–9, FIG. 3, to disconnect the preset access switches S1–S8 from the system and to connect all of the contacts PB–0, PB–1 . . . PB–9 into the system so that these contacts can now function as a means for obtaining energizing access to any counter relay. Through the operation of the multivibrator RCFF, FIG. 2, the number "9" pushbutton PB which is depressed to initiate random access is thereafter useable to provide energizing access to the highest order counting relay in either or both the units or tens counters UCTR or TCTR, respectively.

To implement the aforementioned preset access mode of operation, the switches S1–S8, FIG. 3, are preset and closure need only be made of one of the corresponding contacts PB–1—PB–8 to obtain immediate energizing access to a matrix crosspoint which corresponds to the two-digit setting of a particular selected switch S1, S2 . . . S8. For example, the switch S1 is shown as set to the number 66 which corresponds to the relay numbered 66, FIG. 4, in the relay matrix. The closure of the contacts PB–1, FIG. 3, operates to energize the relays K7 of the tens and units counters which close row and column contacts K7–TC and K7–UC to effect the energization of the number 66 matrix relay. The closure of any one of the contacts PB–1—PB–8 may be performed manually through pushbutton switches designated generally as PB, or alternatively, through apparatus that is controlled by perforated cards or perforated tape, for example. The preset access mode provides relatively high-speed access to any preselected matrix crosspoint, minimizes the chance of addressing a wrong matrix coordinate and renders the system susceptible to automatic control through perforated tapes or cards.

The random access mode, on the other hand, is a highly flexible mode of access that permits any matrix crosspoint to be selected or addressed without resorting to the use of preset switches. This mode of operation is initiated by an operator depressing the number "9" pushbutton switch PB, FIG. 3. The closure of the corresponding contacts PB–9 operates to circumvent the preset access switches S1–S8 and conditions the access lines U1L–U9L and T1L–T9L for selective grounding through sequential closure of the pushbutton contacts PB–1—PB–9.

The operator may push any of the ten pushbuttons,

PB, to select any desired two-digit matrix crosspoint, the selection being on a highest-order-digit-first-basis. Thus, if the operator wishes to energize, for example, the number 18 relay in the relay matrix, the number "9" pushbutton PB, FIG. 3, is depressed to condition the system for the random mode of access, and the pushbuttons numbered 1 and 8 are depressed in that sequence to energize the tens counter relay K2, not shown, and the units counter relay K9, FIG. 1, in the tens and units counters TCTR and UCTR, respectively. These counter relays close matrix contacts K2–TC and K9–UC, respectively, FIG. 4, causing energization of the number 18 matrix relay.

In order to facilitate the understanding of the invention, a preferred embodiment of the basic driving unit of the system, a free-running multivibrator or flip flop, will now be described.

PREFERRED EMBODIMENT OF A FREE-RUNNING MULTIVIBRATOR

Referring to FIG. 1, a free-running flip flop, designated UFF, operates as the drive for the units counter and as a clock that establishes the time base of the system. The flip flop UFF comprises three relays A, B and C. Relays A and B have one side thereof connected to a battery —B2 through current limiting resistor RA and RB, respectively, of typically equal ohmic value. The relay C is connected directly to the terminal —B2 and has normally open contacts C–1 in the A relay circuit. The relay C is energized by closure of either pair of contacts W2–4 or R–6 to stop the running of the flip flop UFF. If the present system is to be employed to select terminals or pairs of terminals for testing by appropriate testing apparatus, normally open contacts ED may be provided in the relay C ground circuit; the contacts ED being under the control of a conventional error detector (not shown). The error detector may, for instance, comprise a relay which energizes to close the contacts ED when an error condition, such as a ground on the tested terminal, is detected. The closure of the contacts ED operates to energize the relay C and stop the operation of the units and tens flip flops and counters. A plurality of indicators such as, lamps, not shown, may have one terminal thereof connected to battery —B2 and the other terminals individually connected to each counter line U1L–U9L. Such lamps would serve to indicate the number of the terminal at which an error condition is detected.

Considering the relays A and B, each relay includes a parallel-connected capacitor CA and CB, respectively, which act in conjunction with the resistors RA and RB, respectively, to provide an equal predetermined time-delayed operation and release of relays A and B, respectively. The relay A has contacts A–1 in the ground circuit of relay B while the relay B has contacts B–1 in the ground circuit of the relay A. In addition, the relay A has normally closed contacts A–2 and normally open contacts A–3 in its relay circuit and the relay B has normally closed contacts B–2 and normally open contacts B–2 in its relay circuit. The terminal located between the contacts A–2 and A–3 can be connected to ground through closed contacts ADV–1 if the contacts C–1 are closed. The terminal located between the contacts B–2 and B–3 is normally open circuited by normally open contacts ADV–2.

The relay A has normally open contacts A–4 in the units flip flop output line EOL1 and has normally closed contacts A–5 in the units flip flop output line OOL1. With the contacts A–4 and A–5 in their normal states as depicted by the drawing, the output line OOL1 is normally connected to ground. Upon a reversal of state of the relay A, the contacts A–4 close to put ground upon line EOL1 and the contacts A–5 open to open circuit or to remove ground from the line OOL1.

Prior to the application of battery —B2 to the units flip flop UFF, the relays A and B and their associated relay contacts will be in the states as illustrated by the drawing. The application of battery —B2 to the units flip flop UFF will cause the capacitor CA to charge through the resistor RA for a predetermined interval of time, as determined by the values of the resistor RA and the capacitor CA until the voltage across capacitor CA reaches a voltage level sufficient to operate the relay A. When the relay A operates, the contacts A–1 close to provide a circuit to ground for the relay B. After a predetermined period of time, as determined by the R–C time constant of the resistor RB and the capacitor CB, the relay B operates to open contacts B–1 and deenergize the relay A. The relay A remains operated until the capacitor CA discharges to a voltage level lower than the minimum level required to maintain the relay A in the operative state. When this minimum voltage level is reached, the relay A drops out to reopen its contacts A–1 in the relay B ground circuit and drops out the relay B. The relay B drops out after the capacitor CB discharges below the minimum voltage level required to hold the relay B in the operative state. The dropping out of the relay B conditions the units flip flop for another cycle of operation. Every time the relay A is energized, it operates to reverse the states of contacts A–4 and A–5 so that ground is applied to lines EOL1 and OOL1 in an alternating manner and at a frequency that is primarily determined by the time constants of the resistors RA and RB and the capacitors CA and CB, respectively.

In order to stop the continuous operation of units flip flop UFF, the relay C is energized by the closure of contacts W2–4 or R–6 in the relay C ground circuit or by closure of the error detector contacts ED. Assuming that the relay A is deenergized and the relay C has been energized to close contacts C–1, a circuit is created from battery —B2 through the resistor RA and the now-closed contacts A–2, C–1 and ADV–1 to ground. This circuit shunts the relay A and prevents it from operating even though ground is applied to the ground side of the relay A through the closed contacts B–1. Thus, the relay A will not operate as long as the relay C is energized and the contacts C–1 and ADV–1 are closed.

Conversely, if the relay A is in an energized state, when the relay C is energized and the contacts C–1 close, a circuit path may be traced from battery —B2 through the resistor RA and the relay A, through now-closed contacts A–3 and C–1 to ground. Even though the relay B may operate and remove ground from the relay A by opening the contacts B–1 in the relay A ground circuit, the relay A will remain locked into the operative state. Therefore, the relay C not only operates to hold deenergized relay A in a deenergized state, it also operates to hold energized relay A in an energized state.

The function of the units flip flop advance contacts ADV–1 and ADV–2 is to cause the flip flop UFF to change state while the relay C is operated. The necessity for advancing the units flip flop while the relay C is energized will be disclosed subsequently, and it suffices to state at this point that the contacts ADV–1 and ADV–2 are operated by a single units flip flop advance relay ADV and are caused to reverse their states when the digit, which is selected by the test set operator, is an odd digit, for example, 1, 3, 5, 7 or 9. The states of the contacts ADV–1 and ADV–2 are not changed when the selected digit is an even digit, for example, 2, 4, 6 or 8. The advancing of the units flip flop UFF by operation of the contacts ADV–1 and ADV–2 will now be described.

Assume that the relay C is energized, that the contacts C–1 are closed and the relays A and B are deenergized. If the contacts ADV–1 and ADV–2 are then reversed from their respective closed and open states, as depicted by the drawing, the shunting path for the relay A will be opened by the opening of the contacts ADV–1, but another shunting path will be created around the relay B through closure of the contacts ADV–2. Thus, the relay A will be energized through closed contacts B–1 and the relay B will be held inoperative. The energization of the relay A will cause closure of the contacts A–1 in the relay B ground line and a reversal of state of the contacts A–4 and A–5 from those respective states, as depicted by the drawing, so that ground now appears on the output line EOL1 while the output line OOL1 is open circuited. The subsequent reversal of contacts ADV–1 and ADV–2 will cause these contacts to reassume those respective closed and open states, as depicted by the drawing. The relay A energizes and the contacts A–1 in the relay B ground circuit close. Since the shunt-to-ground which previously existed across the relay B is opened by the opening of the contacts ADV–2, the relay B also energizes through closed contacts A–1. Thus, both relays A and B are now energized. The opening of the contacts B–1 by operation of the relay B does not operate to deenergize the relay A since an energizing circuit for the relay A is still traceable from the battery —B2 through the resistor RA and through the now-closed contacts A–3, C–1 and ADV–1 to ground.

If the states of the contacts ADV–1 and ADV–2 are again reversed so that contacts ADV–1 reopen and the contacts ADV–2 reclose, the relay A deenergizes, but a holding circuit that is traceable through now-closed contacts B–3 and ADV–2 to ground, holds the relay B in the energized state. The switching of the contacts ADV–1 and ADV–2 back to those states as depicted by the drawing, operates to deenergize the relay B, the relay A remaining deenergized.

Thus, the relay C is energized to stop the free-running of the units flip flop UFF and to condition this flip flop for bistable operation or switching under the control of the contacts ADV–1 and ADV–2. When the relay C is released by the reopening of contacts W2–4 and R–6, the contacts C–1 reopen and the units flip flop UFF will then proceed to run at a frequency determined by the R–C time constants provided by the resistors RA and RB and the capacitors CA and CB, respectively. The units flip flop UFF drives the units counter UCTR which will be described subsequently.

Although the aforedescribed multivibrator constitutes a preferred embodiment of the invention, other types of free-running multivibrators may be modified by those skilled in the art to provide alternating drives for the units counter UCTR. One possible alternative, for instance, is provided by the multivibrator disclosed in U.S. Pat. No. 2,737,614 to F. A. Bonomi. In addition to a free-running multivibrator, the present system includes a bistable multivibrator for driving the tens decade counter and an essentially identical bistable multivibrator which operates a relay control circuit during the random access mode. To further facilitate an understanding of the invention, a preferred embodiment of one of the multivibrators, the tens flip flop TFF, is disclosed below.

PREFERRED EMBODIMENT OF A BISTABLE MULTIVIBRATOR

Referring to FIG. 1, the preferred embodiment of the bistable multivibrator comprises two relays E and F having one side thereof connected through current limiting resistors RE and RF, respectively, to a source of battery —B2. The relay E has contacts E–1 which close upon energiatizon of the relay E to ground the corresponding sides of the relays E and F. The relay F has two pairs of normally open and normally closed contacts F–1 and F–2, respectively, in the relay E circuit; two pairs of normally open and normally closed contacts F–3 and F–4 in its own relay circuit; and two pairs of normally open and normally closed contacts F–5 and F–6, respectively, in the flip flop output lines EOL2 and OOL2. A pair of diodes D6 having their cathodes connected intermediate the contacts F–1, F–2 and F–3, F–4 prevents the ground that appears on one relay from shunting out the other relay. Ground may be applied to the terminal TFAD to cause operation of the flip flop TFF in a manner which will now be described.

To operate the flip flop TFF, ground is momentarily applied to the advance terminal TFAD and traces through to energize the relay E. The energized relay E closes its ground contacts E–1 and thereby locks itself into the operative state. The closure of contacts E–1 does not operate to energize the relay F since the ground, which is applied to advance terminal TFAD, traces through the closed contacts F–3 and appears on the battery side of the relay F thereby shunting the relay F to ground. With the relay E energized and the relay F deenergized, ground will remain on the output line OOL2.

If ground is removed from the terminal TFAD, the relay F will energize through now-closed contacts E–1 and cause a reversal of all F contacts from those respective states, as depicted by the drawing. The relay E remains locked in the operative state during this interval. The contacts F–5 close and the contacts F–6 open to transfer ground from the output line OOL2 to the output line EOL2.

If ground is momentarily reapplied to the advance terminal TFAD, the relay E will drop out because the ground that is applied to the terminal TFAD will trace through the closed contacts F–1 and appear on the battery side of relay E. The relay F remains operated at this time even though the contacts E–1 are now open because ground traces from the terminal TFAD through now-closed contacts F–4. The contacts F–5 remain closed causing ground to remain on the output line EOL2. The output line OOL2 is open circuited at this time by the now-open contacts F–6.

The subsequent removal of ground from the terminal TFAD causes the hitherto energized relay F to drop out and restore the states of all F contacts to those respective states, as depicted by the drawing. The relay E remains in the inoperative state as will be apparent.

Summarizing briefly the operation of the flip flop TFF, the initial application of ground to the flip flop advance terminal TFAD leaves a ground on the output line OOL2 and the subsequent removal of ground from the terminal TFAD causes the relay F in the flip flop to change state and transfer ground from the line OOL2 to the line EOL2. The reapplication of ground to the terminal TFAD does not operate to transfer ground from line EOL2 and only after ground is removed again from the terminal TFAD will ground transfer from the line EOL2 to the line OOL2. The units flip flop UFF drives a units counter UCTR and the tens flip flop TFF drives a tens counter TCTR. Preferred embodiments of both counters are disclosed hereinbelow.

PREFERRED EMBODIMENT OF A DECADE COUNTER

FIG. 1 illustrates a decade counter that is suitable for use as a units counter UCTR and as a tens counter TCTR. For the purpose of explaining the construction and operation of this type of counter, only the units counter will be described in detail, it being understood that the tens counter may be constructed essentially identical to the units counter.

The units counter includes five odd-numbered relays K1, K3, K5, K7 and K9 and five even-numbered relays K2, K4, K6, K8 and K10 having the upper ends thereof connected to battery —B2. The relay K1 corresponds to decimal number "0" and the relay K10 corresponds to decimal number "9," the relays K2–K9 corresponding to digits 1–8, respectively. In the tens counter TCTR there are also ten counting relays arranged in the same fashion, the first relay corresponding to relay K1 and representing tens decimal number "0," the second relay corresponding to relay K2 and representing tens decimal number "1" and so on, with the highest order counting relay representing tens decimal number "9."

One side of each of the relays K2–K9 is normally disconnected from ground by normally open contacts K2–1, K3–1 . . . K9–1, respectively. Upon closure, each contact K2–1, K3–1 . . . K9–1 locks its corresponding energized relay into the operative state. The lower end of relay K1 is normally connected to ground through the series of normally closed contacts K2–2, K4–2 . . . K10–2, and will operate upon application of battery —B2 to the circuit.

During a typical counting cycle, each energized relay, except relay K10, is subsequently deenergized by the next higher order counter relay as a result of the latter relay opening its normally closed contacts in all lower order relay ground circuits. For example, relay K2 has normally closed contacts K2–2 in the ground circuit of relay K1 so that when the relay K2 is energized, the contacts K2–2 open to deenergize relay K1. Similarly, when relay K3 is energized, contacts K3–2 open to drop out both lower order relays K1 and K2.

The even-numbered relays K2, K4 . . . K10 are conditioned for energization by the closure of odd-numbered contacts K1–3, K3–3 . . . K9–3 located between the lower ends of the relays K2, K4 . . . K10 and the even output line EOL1 of the units flip flop UFF. The closure of the contacts K1–3, K3–3 . . . K9–3 is caused by energizing their respective odd-numbered relays K1, K3 . . . K9. Assuming that one pair of odd-numbered contacts K1–3, K3–3 . . . K9–3 is closed, the application of a ground pulse to the even output line EOL1 of the units flip flop UFF will cause energization of the next higher order even-numbered relay K2, K4 . . . K10. Similarly, the application of a ground pulse to the odd output line OOL1 will energize the odd-numbered relay K3, K5 . . . K9 that has a corresponding even-numbered pair of closed contacts K2–3, K4–3 . . . K8–3. Thus, each operated counting relay conditions a succeeding higher order counting relay for operation and the successive energization of all the counting relays is effected by the alternate application of a ground pulse to the lines EOL1 and OOL1 by the operation of the units flip flop UFF. The energization of the highest order counter relay K10, caused by the prior closure of contacts K9–3 of the relay K9 and the application of a ground pulse to the line EOL1, operates relay K10 which closes contacts K10–1 and K10–3 and opens contacts K10–2. Since the relay K10 locks into the line EOL1 through closure of contacts K10–3, the removal of ground from the line EOL1 causes deenergization of this relay. The relay K10 releases to reclose contacts K10–2 and put ground on the relay K1 which energizes to restart the counting cycle.

The closure of contacts K10–1 operates to put ground on the relay advance terminal TFAD of the tens flip flop TFF through normally closed W3–6 contacts. Since the tens flip flop TFF is energized coincidentally with the units flip flop and the units and tens counters upon application of battery —B2 to the circuit, the application of a ground pulse to the terminal TFAD causes the relay E in the tens flip flop TFF to energize. It may be recalled that after battery —B2 is applied to the tens flip flop TFF, ground appears on the output line OOL2 and the initial application of ground to the advance terminal TFAD causes the relay E in the tens flip flop TFF to operate. However, the flip flop TFF does not operate at this time to transfer ground from the line OOL2 to the line EOL2 and therefore the tens counter TCTR does not advance. After the relay K10 releases and reopens contacts K10–1 to remove ground from the advance terminal TFAD, the relay F in the tens flip flop TFF operates to transfer ground from the line OOL2 to the line EOL2 which advances the tens counters one count. The units counter thus recycles and the total count registered by both counters advances from decimal number "09" to decimal number "10."

To summarize briefly, the tens flip flop TFF is initiated every time the units counter UCTR registers a count of ten and upon the release of the flip flop TFF by the dropping out of the units counting relay K10, the tens flip flop TFF advances the tens counter TCTR once.

The even-numbered relays K2, K4, K6, K8 and K10 of the units counter UCTR operate respective contacts K2–4, K4–4, K6–4, K8–4 and K10–4 which close upon energization of their respective even-numbered relays to apply ground to one of odd-numbered units counter output leads CO1, CO3, CO5, CO7 or CO9. In addition, the tens counter TCTR has similar even-numbered tens relays, not shown, with contacts K2–1, K4–1 . . . K10–1 that close as each even-numbered relay is energized to apply ground to odd-numbered tens counter output leads CO10, CO30, CO50, CO70 and CO90. The grounding of any one of the leads CO1, CO3 . . . CO9 or of any one of the leads CO10, CO30 . . . CO90 is utilized during an access mode to properly orient or synchronize the units or the tens flip flop.

The odd-numbered units counter output leads CO1, CO3 . . . CO9 are joined together at a terminal TU2 located on the ground side of the units flip flop advance relay ADV. Since terminal TU2 will only be connected to relay ADV when contacts W3–2 close, the energization of the advance relay ADV is not only predicated upon ground being applied to one of the leads CO1, CO3 . . . CO9, but is also predicated upon the coincidental closure of the contacts W3–2. The contacts W3–1 are only closed when the system is in an access mode of operation which will be described in detail subsequently.

The relay ADV, FIG. 1, has normally closed contacts ADV–1 and normally open contacts ADV–2 in the units flip flop UFF advance circuit. With the contacts ADV–1 and ADV–2 in the states depicted by the drawing, ground is applied to odd-numbered output line OOL1. Assuming the contacts C–1 are closed to prevent the running of the multivibrator UFF, initial operation of the contacts ADV–1 and ADV–2 will cause the relay A to change state and restoration of the contacts ADV–1 and ADV–2 will cause the relay B to change state also, for reasons disclosed hereinabove.

Similarly, odd-numbered output lines CO10, CO30 . . . CO90 of the tens counter TCTR are joined at a common terminal TC1 which has normally open contacts W3–4 and normally closed contacts W4–4 and UR–10 between it and the tens flip flop advance terminal TFAD. Again, the application of a ground to one of the output lines CO10, CO30 . . . CO90 coupled with the closure of contacts W3–4, causes the relay E in the tens flip flop TFF to energize. When the contacts W4–4 open, the relay F in the tens flip flop TFF deenergizes and applies ground to even-numbered output line EOL2. The contacts W3–4 and W4–4, respectively, close and open in succession only during an access mode and the contacts UR–10 are opened after access is made to the tens counter and while access is being made to the units counter to ensure against the tens flip flop being driven again during this period. The contacts W3–5 in the tens flip flop output line OOL2 open prior to, and remain open during, the switching of the tens flip flop TFF to prevent the advancement of the tens counter TCTR during the period when the flip flop TFF is being synchronized.

DESCRIPTION OF OPERATION OF UNITS AND TENS COUNTERS

Assuming that the system is not in an access mode of operation and that battery —B2 is on both flip flops and counters, the relay K1 in the units counter UCTR corresponding to the units digit "0," and the lowest order counting relay (not shown) in the tens counter TCTR, corresponding to tens digit "0," are immediately energized through their closed ground contacts. The ground contacts in the tens counter TCTR which are not illustrated correspond to ground contacts K2–2, K3–2 . . . K10–2 in the units counter UCTR. The energized relay K1 in the units counter operates to close contacts K1–3 that condition the relay K2 for operation. The subsequent application of a ground pulse to the line EOL1 by the now-energized units flop flop UFF will cause the units counting relay K2 to energize. The relay K2 energizes to open contacts K2–2 and take ground off the lower side of the units counter relay K1, causing the latter relay to release. Similarly, the units counter relay K2 will lock itself into the operative state by closing contacts K2–1 and will condition units counter relay K3 for operation by closing contacts K2–3. The subsequent application of ground to the odd-numbered line OOL1 by the units flip flop UFF will operate to energize the units counter relay K3 and to deenergize the relay K2 while conditioning units counter relay K4 for subsequent energization. This sequential counting operation continues at the switching frequency of the flip flop UFF until the counting relay K10 is energized by the application of ground to the even lines EOL1 through closed contacts K9–3. The energized relay K10 in the units counter operates to close contacts K10–1 and apply ground to the advance terminal TFAD of the tens flip flop TFF. Upon the subsequent deenergization of the relay K10 by the units flip flop UFF removing ground from the even line EOL1, the tens flip flop TFF changes state and advances the tens counter TCTR once.

The units and tens counters may be individually accessed to register any desired initial count that is equal to, or less than decimal number 99. Direct access to any counting relay of the units or the tens counter, other than the lowest order counter relay in each counter, is effected by grounding one of the counter access leads U1L–U9L and/or one of the counter access leads T1L–T9L. The odd-numbered leads U1L, U3L . . . U9L and T1L, T3L . . . T9L are connected to the ground sides of units and tens even-numbered relays K1, K4 . . . K10, and the even-numbered leads U2L, U4L, U6L and U8L and T2L, T4L, T6L and T8L are respectively connected to the ground sides of units and tens odd-numbered relays K3, K5, K7 and K9. If ground is applied to any one of leads U1L–U9L of the units counter UCTR or to any one of the leads T1L–T9L of the tens counter TCTR, a corresponding counting relay will be conditioned for operation. Upon restoration of battery —B2 to both counters, and assuming that the selected lead is still grounded, the relay associated with the selected lead will be energized and will lock itself into the operated state.

For reasons that will be evident subsequently, the contacts W2–1 close by operation of relay W2 to restore battery —B2 to the flip flops and counters a predetermined period of time, typically 0.1 second, after the contacts W1–1 are opened through energization of relay W1. The opening of the contacts W1–1 serves to remove battery —B2 from the units and tens flip flops and counters whereupon the flip flops are returned to their deenergized states and the counter relays deenergize. Conversely, the relay W2 opens contacts W2–1 shortly after the contacts W1–1 are closed by release of the relays W1 and W2. This overlapping of contact closures ensures a continuous application of battery —B2 to the flip flop counters while the relay W1 and W2 are being deenergized. Thus, the relays W1 and W2 serve to momentarily remove —B2 from all flip flops and counters so that they may start either access mode in the normal state, that is with the relays A, B, E and F deenergized and only the lowest order counter relay K1 of each counter energized.

If access is made to an even-numbered counter relay of either counter that accessed relay will operate to close its associated contacts and put ground on a corresponding odd-numbered output line. For example, if access is made to relay K6 in the units counter UCTR through lead U5L, contacts K6–4 will close and put ground on odd-numbered units counter output line CO5. Assuming that contacts W3–2 are closed and that contacts W3–3 are open at this time, ground will trace through the counter output line CO5 and energize the units flip flop advance relay ADV. The relay ADV closes contacts ADV–1 which cause the units flip flop relay A to energize. Ground did not previously appear on the output line OOL1 because contacts W3–3 open circuited the line OOL1 at that time. The units flip flop UFF was thereby precluded from driving the units counter UCTR before synchronization of the units flip flop UFF.

The relay A operating through the closure of the contacts B–1 puts ground on the even-numbered output line EOL1. The units flip flop UFF is now synchronized with the accessed units counter, and the ground that appears on even-numbered output line EOL1 corresponds to the fact that an even-numbered counter relay, specifically the relay K6, is being accessed and energized.

Similarly, if access is made to an even-numbered relay in the tens counter TCTR that relay will energize and place ground on its corresponding odd-numbered output line CO10, CO30, CO50, CO70 or CO90. Assuming that the contacts W3–3, W4–4 and UR–10 are closed at this time, ground will trace through these closed contacts to the tens flip flop advance terminal TFAD and thereby change the state of the relay E in the tens flip flop TFF. The normally closed contacts W3–5 in the odd-numbered output line OOL2 will open while access is being made into the tens counter TCTR so that the tens counter is not advanced by the tens flip flop TFF during the access mode. Upon the subsequent opening of the relay contacts W4–4, the relay F in the tens flip flop TFF will energize and put ground on the even output line EOL2. Again, the application of ground to the even output line EOL2 corresponds to the fact that an even-numbered tens counting relay has been accessed and energized.

In the random access mode of operation, access is initially made to the tens counter TCTR and thereafter to the units counter UCTR by momentarily grounding the selected counter input line on a highest-order-digit-first basis. In order to prevent the second closing of the contacts W3–4 and subsequent opening of contacts W4–4 from driving the tens flip-flop TFF again when access is made subsequently to the units counter, the contacts UR–10 are opened to open circuit the tens flip flop advance terminal TFAD. The contacts UR–10 are held open until the units counter UCTR is accessed and its driving flip flop UFF properly oriented as described above. The necessity for synchronizing the driving flip flops results from the need to directly access individual counter relays and may be more readily understood by considering only the units flip flop UFF and the units counter UCTR. If the units flip flop were not synchronized with the units counter before the access button is released, when an even-numbered relay, for example the units relay K6, is selected and eenrgized, upon the release of the access button the contacts W3–3 would reclose and apply ground through the now-closed contacts K6–3 to the relay K7. The relay K7 would then energize and lock in through closure of its locking contacts K7–1 and further would reopen the contacts K7–2 thereby causing the relay K6 to release. Thus, the next higher order counting relay in the units counter UCTR would be energized. This situation is applicable not only to the units flip flop and the units counter, but the tens flip flop and the tens counter as well.

If instead, an even digit is selected through the grounding on even-numbered counter input line and a corresponding odd-numbered counter relay is energized, there is no need to synchronize, for example the units flip flop UFF with the units counter UCTR, since the momentary removal of the battery —B2 by operation of the relays W1 and W2 will leave the units flip flop relays A and B deenergized. The output ground which appears on the line OOL1 of the units flip flop UFF agrees with the fact that an odd-numbered units counter relay has been selected.

Similarly, the contacts K2–1, K4–1 . . . K10–1 in the tens counter TCTR and the contacts W3–4, W4–4 and UR–10 are employed only when an even-numbered tens relay is selected for energization. As in the case of the units flop flop UFF, the relays E and F of the tens flip flop TFF are left unenergized after the battery —B2 is momentarily removed from this flip flop and its counter. The ground which appears on the output line OOL2 of the tens flip flop TFF agrees with the fact that the operator has selected an even digit and has thereby effected the direct energization of an odd-numbered counting relay in the tens counter TCTR.

DESCRIPTION OF THE PRESET ACCESS MODE

In order to implement the preset access mode of operation, use is made of a plurality of switches which are manually preset to correspond with preselected terminals of the wired product which is to be tested. These preset switches permit the operator to obtain almost instantaneous access to any one of eight preselected wired product terminals by the operator merely pressing one of eight pushbuttons.

Referring now to FIG. 3, the circuitry for implementing the preset access mode is shown as including eight access lines AL1–AL8 that trace through normally closed contacts of the relays UR and TR to eight multiterminal thumbwheel switches S1–S8, respectively. The lines AL1–AL8 have terminals T1–T8, respectively, which are connected to the anodes of diodes D8. The diodes D8 prevent the lines AL1–AL8 from grounding when line ACL1 is grounded by, for example, the closing of contacts PB–0. The switches S1–S8 are conventional thumbwheel switches with each switch S1–S8 including a units bank of ten contacts and a tens bank of ten contacts and two slide arms SW1 and SW10. The slide arm SW10 is in the tens terminal bank of each switch and the slide arm SW1 is in the units terminal bank of each switch. Each slide arm SW1 and SW10 may be individually moved by a thumbwheel, not shown, to make electrical contact with one of ten terminals in the units or tens bank of each switch S1–S8, only terminals numbered 1–9 normally being used, for reasons that will be evident subsequently. Each thumbwheel has its periphery scribed and numbered 0–9 so that an operator can visually select by number any terminal in either the units or the tens bank of each switch S1–S8.

It may be noted that the number "0" pushbutton switch PB is only connected to an access line ACL1 and not to any of the lines AL1–AL8. The purpose of this pushbutton is normally to reset the units and tens counters so that they register a total count of "00," and therefore, the terminals numbered "0" in the switches SW1–SW8 need not be connected to respective tens or units counter input lines T1L–T9L or U1L–U9L. The characteristic of the system to reset the units and tens counters will be evident by tracing the circuit which the contacts PB–0 are closed by the operator depressing the number "0" pushbutton PB.

When the corresponding contacts PB–0 close, ground is applied directly to an access control line ACL1 and traces through the line ACL1 to the ground side of the relays W1 and W2, FIG. 2. The relay W1 energizes and opens contacts W1–1, FIG. 1, thereby removing battery —B2 from the counters UCTR and TCTR and causing all counter relays to release. The relay W2, FIG. 2, energizes typically 0.1 second after relay W1 closes contacts W2–1, FIG. 1, thereby restoring battery —B2 to the counters UCTR and TCTR. Under these circumstances, and for reasons disclosed above, the K1 relays in both the units and tens counters UCTR and TCTR, respectively, will energize so that the units counter UCTR registers units digit "0" and the tens counter TCTR registers tens digit "0" for a total registered count of "00."

With the slide arms SW1 and SW10 moved to positions of electrical contact with certain preselected units and tens terminals of any one of all of the switches S1–S8, the operator need only press a corresponding pushbutton PB to close a pair of corresponding pushbutton contacts PB–1—PB–8 which put ground on a terminal T1–T8, respectively, and hence on a corresponding units and tens switch line US1–US8 and TS1–TS8, respectively. Thus, the ground which is placed on any one of the units switch lines US1–US9 and on any one of the tens switch lines TS1–TS9 traces through corresponding units counter lines U1L–U9L and through corresponding tens counter lines T1L–T9L. It may be recalled that the units counter lines U1L–U9L are individually connected to the ground sides of individual relays in the units counters UCTR, and the tens counter lines T1L–T9L are individually connected to the ground sides of the individual counting relays in the tens counter TCTR. Direct access to any relay in the units counter UCTR and to any relay in the tens counter TCTR may be made simultaneously and substantially instantaneously by applying ground to any one of the switches S1–S8. The switches S1–S8 thus serve to concentrate the eighteen units and tens counter lines U1L–U9L and T1L–T9L to eight access lines AL1–AL8.

Although the resetting of the units and tens counters to register "00" by the depression of the single numbered pushbutton PB may be viewed as a special case of preset access, normally the preset access switches S1–S8 are set to obtain immediate access to any desired crosspoint of the relay matrix of FIG. 4. Each of the one-hundred relays in this matrix forms a matrix crosspoint designated by a two-digit number that corresponds to a two-digit count which may be registered by the units and tens counters.

The selection of any matrix relay, FIG. 4, is made through the coincidental application of ground and battery to the opposite terminals of the desired relay through closure of corresponding row and column contacts K1–UC—K10–UC and K1–TC—K10–TC, respectively.

The units counter relays K1–K10, FIG. 1, in the units counter UCTR operate normally open contacts K1–UC—K10–UC, respectively, FIG. 4, which close to apply battery —B1 to one of ten corresponding columns of ten relays each. Similarly, the energization of any selected tens relay, not shown, in the tens counter TCTR, FIG. 1, operates to close a pair of corresponding matrix contacts K1–TC—K10–TC, FIG. 4, to apply ground to a corresponding row of matrix relays. The relay located at the intersection of the selected units counting relay contacts and the selected tens counting relay contacts is energized, and as the counters advance sequentially, the matrix relays energize in indicated numerical sequence. The operation of the relays may, for instance, be converted into contact closures which selectively connect correspondingly numbered or designated wired product terminals to continuity detectors or short detectors, or to both, in a manner well-known to those working in the testing art. It will be appreciated that whereas the relay matrix of FIG. 4 constitutes a preferred utilization device, matrices utilizing, for example, solid state crosspoint devices or other types of utilization devices might be substituted for this relay matrix.

The operation of the relay matrix when considered in conjunction with the circuit for implementing the preset access mode will be apparent from the following description.

To facilitate an understanding of this mode of access, assume that access is desired to the 65th crosspoint of the test matrix, or in other words to the number "65" matrix relay. The switch S3, for example, may be initially set with its units slide arm SW1 in electrical contact with the 5th terminal in the units terminal bank of that switch and with its tens slide arm SW10 set in electrical contact with the terminal numbered 6 in the tens bank of this switch. The operator is apprised of this connection by observing the positions of the numbers on the thumbwheels not shown. The operator may then depress the number "3" pushbutton PB to close the contacts PB–3.

The closure of the contacts PB–3 puts ground on the access control line ACL1 and on the terminals numbered 5 and 6 in the units and tens section, respectively, of the switch S3. The ground which is placed on these terminals traces through units switch lines US5 and tens switch lines TS6. The ground appearing on the units line US5 also appears on the units counter line U5L, and similarly the ground appearing on the tens switch lines TS6 also appears on the tens counter line T6L.

The grounding of the lines U5L and T6L operates to energize the relay K6 and K7, respectively, FIG. 1, in the units and tens counters, respectively, and these relays lock themselves into the operative state. The energization of these two counter relays operates to select the relay number 65 in the matrix, FIG. 4, by closing units contacts K6–UC and tens contacts K7–TC.

Since the selected units digit number 5 is an odd number, the units flip flop UFF must be conditioned to put ground on the even output line EOL1 of the units counter UCTR when the number 3 pushbutton PB is released. This orientation of the units flip flop is effected through the relay control circuit of FIG. 2 and therefore attention is directed to that figure.

The application of ground to the line ACL1 operates the relays W1, W2, W3 and W4 in succession and for reasons set forth hereinabove. The relay W1 operates to open contacts W1–1, FIG. 1, to remove battery —B2 from the units and tens flip flops and units and tens counters and causes these flip flops and counters to reset. The relay W2 then operates to close contacts W2–1, FIG. 1, to restore battery —B2 to the flip flop and counters. The contacts W2–4, FIG. 1, in the relay C circuit of the units flip flop UFF also close to energize the relay C. The relay C operates to close the contacts C–1 and to change the units flip flop from a free-running multivibrator to a bistable multivibrator thereby precluding the counters from counting while the system is in an access mode of operation. The relay W3, FIG. 2, then operates immediately following the operation of relay W2 and closes contacts W3–1 to condition the relay W4 for operating. Further, the relay W3 operates to open contacts W3–3 to prevent the units counter relay K7 from advancing when battery —B2 is again applied to the units counter UCTR upon closure of the contacts W2–1. The contacts W3–2 in the units counter output circuit close so that ground traces through the now-closed contacts K6–1 to the ground side of the units flip flop advance relay ADV.

The relay ADV operates to reverse the state of the contacts ADV–1 and ADV–2, FIG. 1, from those as depicted in this figure. The relay A in the units flip flop UFF energizes and opens contacts A–5 in the line OOL1 of the units counter UCTR, thereby precluding the relay K7 from operating upon release of the relay W3 and the reclosure of the contacts W3–3. The contacts W3–4 close to advance the tens flip flop TFF, but the tens flip flop TFF is not advanced because the selected tens digit, the digit 6, is an even digit and energizes the odd-numbered K7 relay in the tens counter TCTR. Thus, there is no need to orient the tens flip flop with the tens counter and this fact is manifested by failure of ground to appear on any of the counter output leads CO10, CO30 . . . CO90. The opening of the contacts W3–5 and W3–6 is of no consequence at this time. The relay W4, FIG. 2, energizes typically 0.1 second after the relay W3 to momentarily open the contacts W4–4, FIG. 1, in the tens flip flop TFF advance line. Since the terminal TC1 is not grounded at this time, the opening of the contacts W4–4 does not serve to remove ground from the advance terminal TFAD and change the state of the tens flip flop TFF. If, however, an even-numbered relay in the tens counter TCTR were energized, the terminal TC1 would be grounded and upon closure of the contacts W3–4, the terminal TFAD would be grounded and cause the relay E in the tens flip flop TFF to energize. Upon the opening of the contacts W4–4, the terminal TFAD would be open circuited causing the relay F in the tens flip flop to energize and apply ground to the even output lead EOL2 of the tens counter TCTR.

Upon release of the number "3" pushbutton, FIG. 3, contacts PB–3 reopen and the relays W1, W2, W3 and W4, FIG. 4, deenergize. Since there is an overlapping in contact closure by the contacts W1–1 and W2–1, FIG. 1, the battery —B2 remains on the —B2 terminals of the flip flops and counters. The release of the relay W2 is of significance because it operates to reopen its W2–4 contacts, FIG. 1, in the relay C ground circuit. The reopening of the contacts W2–4 operates to release the units flip flop UFF for free-running operation, and therefore, after the preselected matrix crosspoint is accessed, the units and tens counters are driven to sequentially energize the remaining matrix relays.

When the selected tens digit is odd, for reasons disclosed above, ground will trace through to the advance terminal TFAD of the tens flip flop TFF upon closure of the contacts W3–4. A special situation arises if the selected tens digit is odd and if the selected units digit is the digit 9. In this case the relay K10 in the units counter UCTR will energize and upon its release will attempt to advance the tens counter TCTR through the closure of the contacts K10–1 in the tens flip flop ground advance circuit. It may be recalled that the orientation of the tens flip flop with its counter, requires that the tens flip flop terminal TFAD be grounded and then open circuited by the opening of the contacts W4–4. If the contacts K10–1 close and lock in by operation of the units counter K10 relay, ground would remain on the terminal TFAD and prevent the tens flip flop TFF from changing state upon the reopening of the contacts W4–4.

In order to provide for proper switching of the flip flop TFF when the digit "9" is selected as the units digit, the contacts W3–6 in the ground advance circuit of the flip flop TFF are opened by operation of the relay W3 coincidentally with the closure of the contacts W3–4, thereby disconnecting the contacts K10–1 from the terminal TFAD and permitting the tens flip flop TFF to change state under the control of the tens counter TCTR.

DESCRIPTION OF THE RANDOM ACCESS MODE

The random access mode permits the test set operator to obtain immediate access to any desired crosspoint of the relay matrix and hence to any desired terminal of the wired product under test. The terminal may be one which has been previously tested or one which has not yet been tested by the normal sequencing of the system.

To initiate the random access mode, the operator depresses the number "9" pushbutton switch PB, FIG. 3, to close the contacts PB–9 and apply ground to the random access line RAL1. Ground will not trace through from the access line AL9 to either of the lines U9L or T9L because of the normally open contacts UR–5 and TR–5.

The ground which appears on the line RAL1, FIG. 2, operates to energize the relay R, which closes its contacts R–1 and thereby locks itself into the operate state. The relay R has contacts R–6, FIG. 1, in the units flip flop relay C circuit which close upon energization of the relay R to ground the relay C and thereby stop the operation of the units flip flop UFF. Thus, both the units and tens counters are precluded from operating.

Referring again to FIG. 2, the relay R opens contacts R–2 which disconnect the ground side of the relay R from the access lines RAL1 and ACL1. Though the access control line ACL1 is disconnected from the relay R, it is connected to the flip flop advance terminal TFAD of flip flop RCFF by the closure of the contacts R–3. The contacts R–4 close to lock the relays W1 and W2 in the operate state and the contacts R–5 close to apply ground to the flip flop RCFF to condition this flip flop for operation. The contacts R–5 on the ground circuit of the flip flop RCFF serve the same purpose as the contacts K10–1 in the ground circuit of the tens flip flop TFF. Ground which is applied to the line RAL1 traces through the now-closed contacts R–3 and operates the relays W3 and W4 in succession.

The relay W1 operates upon closure of the contacts R–4 to open contacts W1–1, FIG. 1, and remove battery —B2 from the units and tens flip flops and counters. The operation of the relays W3 and W4 by closure of the contacts R–3 is of no significance at this time. The delayed operation of the relay W2 closes contacts W2–1 and restores battery —B2 to the units and tens flip flop and counters. This momentary removal of battery —B2 resets the counters to decimal "0" (K1 operated) and the flip flops UFF and TFF to the deenergized states.

The random access button is then released by the operator. The contacts PB–9 reopen to open-circuit the random access line RAL1. Since the contacts R–3, FIG. 2, are closed and remain closed while the relay R remains locked into its operative state, the random access line RAL1 now operates in the same manner as the access control line ACL1 so that the operator can use the random access button to select the digit "9" as a units or tens digit.

Upon the release of the random access button, ground is removed from the terminal TFAD and the relay F in the flip flop RCFF operates to remove ground from the line OOL3 and to put it on the line EOL3. The ground which appears on the line EOL3 operates the tens relay TR through diode D9 and the relay TR locks in through closure of its contacts TR–1, the contacts R–5 being closed by previous operation of the relay R. The energized relay TR closes tens relay contacts TR–1 and TR–2 and in addition, operates to reverse the respective states of all TR–4 and TR–5 contacts from those states as depicted by FIG. 3.

The opening of the contacts TR–4 serves to disconnect the switches S1–S8 from the access line AL1–AL8, respectively, and the closure of all TR–5 contacts serves to connect the tens lines T1L–T9L to the access lines AL1–AL9, respectively. The system is now conditioned for energizing any desired matrix crosspoint in response to any selected two-digit number. These numbers are routed into the system on a highest-order-digit-first basis; that is to say, the tens digit is routed into the system before the units digit.

The operator then selects and pushes the numbered pushbutton switch PB that corresponds to the tens digit and the corresponding pair of pushbutton contacts PB–0, PB–1 . . . PB–9 close. For reasons disclosed hereinabove, the closure of the contacts PB–0 will not reset the tens counter so that this counter continues to register tens digit "0" when the operator presses the number "0" pushbutton PB. The closure of contacts PB–1, PB–2 . . . PB–9 operates to ground respective terminals T1–T9 and respective access lines AL1–AL9 and hence respective tens counter access lines T1L–T9L causing a corresponding relay in the tens counter TCTR to energize and lock-in. Ground will also appear on the access control line ACL1, or on the random access line RAL1 if the digit "9" is selected.

Referring to FIG. 2, when ground is applied to either the access control line ACL1 or the random access line RAL1, the relay control flip flop RCFF will have ground applied to its advance terminal TFAD. The relay E in the flip flop RCFF will then deenergize, but the relay F remains operated as explained previously.

For reasons disclosed above, if the selected tens digit is an odd digit, an even-numbered tens counter relay will be energized, will close its corresponding contacts K2–1, K4–1 . . . K10–1 in the tens counter TCTR and apply ground to one of the tens counter output lines CO10, CO30 . . . CO90. The ground which appears on one of these output lines traces through upon closure of the contacts W3–4 to the tens flip flop advance terminal TFAD.

Referring again to FIG. 2, when ground is applied to the line ACL1 or RAL1, the relay W–3 energizes because the contacts W2–3 are now closed through the operation of the relay W2. Thus, the ground which appears on the terminal TC1 traces through the now-closed contacts W3–4 and appears on the tens flip-flop advance terminal TFAD, causing energization of the relay E in the relay advance flip flop RCFF. Subsequent energization of the relay W4 by closure of the contacts W3–1 operates to open the contacts W4–4, FIG. 1, between the terminals TC1 and TFAD, thereby open circuiting the terminal TFAD and causing the relay F in the tens flip flop TFF to energize and put ground on the even output line EOL2.

Upon release of the selected pushbutton PB, the relays W3 and W4, FIG. 2, release and ground is removed from terminal TFAD. The removal of ground from the terminal TFAD causes the relay F in the flip flop RCFF to release and apply ground to the output line OOL3. Since contacts TR–2 are now closed, the relay UR energizes to close contacts UR–1 and UR–2. The contacts UR–1 close to lock the relay UR into its operative state and the contacts UR–2 close to condition the relay R for subsequent deenergization when the flip flop UFF changes state and applies ground to the output lead EOL3. The diode D9 prevents ground which appears on the cathode of this diode from tracing down to the battery side of the relay R after the contacts UR–2 close.

The energization of the relay UR also operates to reverse the states of all UR–4 and UR–5 contacts from those respective states as depicted by FIG. 3. The opening of the contacts UR–4 operates to disconnect the tens counter line T1L–T9L from the access lines AL1–AL8, and the closure of the contacts UR–5 operates to connect the units counter lines U1L–U9L to the access lines AL1–AL9, respectively. Thus, when the operator depresses the pushbutton which corresponds to the desired units number, ground which is applied to the corresponding access lines AL1–AL9 by closure of the corresponding pushbutton contacts traces through a corresponding units counter line U1L–U9L and energizes a corresponding relay in that counter. The input lines T1L–T9L to the tens counter TCTR will be opened by the now-open contacts TR–4, so as not to change the count that is registered by the tens counter TCTR.

The contacts UR–10, FIG. 1, located between the terminal TC1 and TFAD of the tens flip flop TFF, open to prevent the ground from K2–1, K4–1, etc., in the event an even tens relay was previously selected, from appearing on the terminal TFAD upon closure of the contacts W3–4, the latter contacts closing by operation of the relay W3, FIG. 2. The relays W3 and W4 operate in succession to reverse the states of all W3 and W4 contacts, but since the contacts UR–10 remain open during this period, the operation of the contacts W3–4 and W4–4 is of no consequence.

If the selected units digit is an odd digit, the units counter UCTR will apply a ground to the ground side of the advance relay ADV so that the closure of the contacts W3–2 will operate to advance the units flip flop UFF, for reasons described above. Again, if the selected units digit is an even digit, the advance relay ADV will not be energized and the units flip flop will not change state. Upon release of the units selection button, corresponding contacts contact PB–0—PB–9 will reopen to disconnect the access lines ACL1 and RAL1 from ground. The open circuiting of the lines ACL1 and RAL1, FIG. 2, operates to release the relays W3 and W4 in succession for reasons which now should be apparent. The relay control flip flop terminal TFAD is open circuited causing the relay F in the flip flop RCFF to operate and apply ground to the even output line EOL3. Since the contacts UR–2 are now closed, the ground which is applied to the line EOL3 traces down to the battery side of the relay R and shunts the relay R from the battery —B1. The relay R releases and all R relay contacts reassume those states as depicted by FIG. 2. The contacts R–1 reopen to break the locking circuit of the relay R and the contacts R–2 reclose to condition the relay R for a subsequent random access mode of operation. Contacts R–4 reopen to deenergize the relays W1 and the relays W2. The deenergization of the relay R also operates to reopen the contacts R–6, FIG. 1, in the relay C ground circuit thereby conditioning the units flip flop UFF for operation.

The relay W1 drops out immediately and the relay W2 deenergizes with a short time delay. The contacts R–5 in the RCFF flip flop ground circuit reopen to deenergize the flip flop RCFF, the tens relay TR and the units relay UR. When the flip flop RCFF is released, ground is transferred from the line EOL3 to the line OOL3. The units relay UR releases to reopen its contacts UR–2, thereby conditioning the relay R for subsequent operation.

When the relay UR deenergizes, the contacts UR–4 and UR–5, FIG. 3, reassume those respective closed and open states as depicted by the figure, thereby disconnecting the units counter lines U1L–U9L from the access lines AL1–AL9. The access lines AL1–AL8 are now reconnected to the switches S1–S8, respectively.

When the relay W2 releases, it reopens the contacts W2–4, FIG. 1, in the units flip flop ground circuit. The reopening of these contacts deenergizes the stop relay C and releases the units flip flop for free-running operation. The counter relays of the units and tens counters to which access was made during the random access mode now operates to select or address the desired matrix crosspoint. The units flip flop proceeds subsequently to advance the units and tens counters so that the matrix crosspoints are addressed or energized in indicated numerical sequence.

As is the case with the preset access mode of operation, if an error or fault is detected during the testing of the wired product, an error or fault detector relay, not shown, may be energized to close the contacts ED in the units flip flop UFF, FIG. 1. The closing of the contacts ED operates to energize the relay C which stops the operation of the flip flop UFF and thus, the operation of the counters and the relay matrix.

The system may be modified so that energizing ground may be applied to the random access line RAL1 through closure of any other pair of contacts PB–0, PB–1 . . . PB–8 to effect a conditioning of the aforedescribed circuit for the random access mode of operation. In such a case, the access control line AL9 could be selectively connected through another pair of normally closed contacts TR–4 and two preset thumbwheel switches to a preselected units switch line US1–US9 and to a preselected tens switch line TS1–TS9.

MANUAL ADVANCE

If the error or fault is detected in a terminal of the wired product which is under test, it is usually preferred that this fact only be recorded by the test operator and that the test matrix proceed to select other test terminals of the wired product. In order to advance the relay matrix after it has been stopped by operation of the error or fault detector relay, not shown, closing the contacts ED of the units flip flop UFF, the operator need only press the pushbutton PB, designated MA in FIG. 3. The pushbutton MA has normally open contacts PB–A, FIG. 1, in the relay ADV ground line so that the pressing of this pushbutton operates to close the contacts PB–A and energize the advance relay ADV. The advance relay ADV then reverses the states of its contacts ADV–1 and ADV–2 of the units flip flop UFF, causing this flip flop to advance the units counter UCTR and the relay matrix. The previously energized error detector will now deenergize and reopen the contacts ED to condition the relay C for subsequent operation. When the pushbutton is released, contacts PB–A open causing ADV relay to release. This restores ADV-1 and ADV–2 to the positions shown on FIG. 1 and allows units flip flop UFF to cycle. The relay matrix then proceeds to advance until the error detector relay is energized again.

What is claimed is:

1. In a decade counting system, a decade counter comprising a series of counting stages that are sequentially energizable to represent odd and even digit inputs, odd digit inputs being represented by a first group of counting stages and even digit inputs being represented by a second group of counting stages;
   - a resettable two-state device selectively coupled to said counter for energizing said counting stages in an alternating odd and even digit sequence;
   - a plurality of selectable counting stage access circuits individually connected to each odd and even digit counting stage for obtaining direct energizing access to a selected counting stage;
   - means responsive to the selection of any access circuit for resetting said device and energizing an associated counting stage;
   - means responsive to the energization of any counting stage of said first group of counting stages for:
     - (1) decoupling said device from said counter; and
     - (2) changing the state of said device while said device is decoupled from said counter whereby said device is set to energize a higher order counting stage of said second group of counting stages representing even digits.

2. In an apparatus for selecting crosspoints of a matrix:
   - units and tens decade counters, each counter including a plurality of counting stages that are sequentially energizable to represent odd and even digits;
   - means operated by energization of a counting stage of the units counter and a counting stage of said tens counter for selecting a matrix crosspoint;
   - pulsing means coupled to the units counter for energizing the counting stages of said units counter in timed sequence;
   - means operated by the highest order counting stage of said units counter for sequentially advancing said tens counter;
   - at least two sets of counting stage selecting leads for providing direct energizing circuit paths to individual counting stages, the first set of said leads including a plurality of leads individually connected to individual units counting stages and the second set of said leads including a plurality of leads individually connected to individual tens counting stages;
   - a plurality of selectively energizable lead energizing terminals;
   - means for selectively connecting one lead of each set of counting stage selecting leads to individual lead-energizing terminals; and
   - means for selectively energizing the individual terminals.

3. The apparatus as claimed in claim 2, wherein said means for selectively connecting one lead of each set of counting stages connecting leads to a lead energizing terminal comprises:
   - a plurality of presettable switches each for connecting a preselected one of said individual lead energizing terminals to a preselected lead of said first set of selecting leads and to a preselected lead of said second set of selecting leads, whereby the energization of said preselected one of said individual terminals causes dual energization of the preselected counting stage selecting leads.

4. The apparatus as claimed in claim 2, wherein said means for selectively connecting one lead of each set of counting stage connecting leads to a lead energizing terminal comprises:
   - means connected to a predetermined individual terminal and operated upon the energization of said predetermined terminal for successively connecting said second set of leads to all of said terminals, and said first set of leads to all of said terminals, whereby the energization of any of said individual terminals subsequent to each successive connection causes successive energization of a corresponding lead of said second and said first set of leads.

5. An apparatus for selecting crosspoints of a matrix comprising:

units and tens decade counters, each counter including a plurality of counting stages that are sequentially energizable to represent odd and even digits;

at least two resettable two-state units and tens counter driving devices, each device being selectively coupled to energize the counting stages of said units and tens decade counters in an alternating odd and even digit sequence;

means operated by a highest order counting stage of said units counter for changing the state of the tens counter driving device whereby said tens counter device advances said tens counter;

at least two sets of counting stage selecting leads for providing direct energizing circuit paths to individual counting stages, the first set of said leads including a plurality of leads individually connected to individual units counting stages and the second set of said leads including a plurality of leads individually connected to individual tens counting stages;

a plurality of selectively energizable terminals;

means for connecting one lead of each set of counting stage selecting leads to individual of said terminals;

means for selectively energizing individual of said terminals to effect the selective energization of corresponding counting stage selecting leads and corresponding counting stages; and means operated by selective energization of a counting stage representing an odd digit for:

(1) decoupling the corresponding counter driving device; and (2) changing the state of the decoupled device so that said decoupled device is set to energize a higher order counting stage of said second group of counting stages representing an even digit.

References Cited

UNITED STATES PATENTS

| | | | |
|---|---|---|---|
| 3,013,251 | 12/1961 | Wright | 340—166 X |
| 3,129,408 | 4/1964 | Hechler | 340—166 |
| 3,165,719 | 1/1965 | Mueller | 340—166 |
| 3,171,098 | 2/1965 | Gabrielson | 340—166 X |
| 3,355,710 | 11/1967 | Schubert | 340—168 X |

HAROLD I. PITTS, Primary Examiner

U.S. Cl. X.R.

340—147, 166, 168